United States Patent
Stein et al.

(10) Patent No.: US 7,197,525 B2
(45) Date of Patent: Mar. 27, 2007

(54) METHOD AND SYSTEM FOR FIXED POINT FAST FOURIER TRANSFORM WITH IMPROVED SNR

(75) Inventors: Yosef Stein, Sharon, MA (US); Haim Primo, Tikwa (IL)

(73) Assignee: Analog Devices, Inc., Norwood, MA (US)

( * ) Notice: Subject to any disclaimer, the term of this patent is extended or adjusted under 35 U.S.C. 154(b) by 585 days.

(21) Appl. No.: 10/389,655

(22) Filed: Mar. 14, 2003

(65) Prior Publication Data
US 2004/0111227 A1   Jun. 10, 2004

Related U.S. Application Data (60) Provisional application No. 60/429,227, filed on Nov. 26, 2002.

(51) Int. Cl.
*G06F 17/14* (2006.01)
*G06F 7/38* (2006.01)

(52) U.S. Cl. .................... 708/409; 708/553
(58) Field of Classification Search ............ 708/409, 708/553
See application file for complete search history.

(56) References Cited

U.S. PATENT DOCUMENTS

| | | | |
|---|---|---|---|
| 3,746,848 A * | 7/1973 | Clary .................. | 708/404 |
| 4,407,018 A * | 9/1983 | Kanemasa ............ | 708/490 |
| 4,501,149 A * | 2/1985 | Konno et al. ........ | 73/587 |

* cited by examiner

*Primary Examiner*—Tan V. Mai
(74) *Attorney, Agent, or Firm*—Iandiorio & Teska (57) ABSTRACT

A system and method of improving signal to noise ration (SNR) in a fixed point fast Fourier transform (FFT/IFFT) generates from sample inputs and a twiddle factor butterfly outputs for each stage; scales the butterfly outputs of this stage from a predicted normalization scale factor to obtain the maximum butterfly output without overflow from this stage; determines from the butterfly outputs of this stage the minimum normalizing exponent for the butterfly outputs of this stage and predicts a normalization scale factor of the next stage from the minimum normalizing exponent of this stage and a stage guard scale value to obtain the maximum butterfly output without overflow from that next stage.

19 Claims, 9 Drawing Sheets

METHOD AND SYSTEM FOR FIXED POINT FAST FOURIER TRANSFORM WITH IMPROVED SNR

RELATED APPLICATIONS

This application claims priority of U.S. Provisional Application Ser. No. 60/429,227 filed Nov. 26, 2002, entitled "Method for FFT calculation using finite precision arithmetic".

FIELD OF THE INVENTION

This invention relates to a method and system for fixed point fast Fourier transform (FFT/IFFT) with improved signal to noise ratio (SNR) due to reduced round-off and overflow errors.

BACKGROUND OF THE INVENTION

Frequency analysis is necessary and desirable in many applications from radar to spread-spectrum communications. Most often the Fourier transform is used for spectral analysis and frequency domain processing. The continuous time Fourier transform operates on a continuous time signal while discrete Fourier transforms (DFT) operate on samples of a signal: the DFT is a sequence of samples or points equally spaced in frequency. A complex summation of many complex multiplications is required for every sample and imposes a time burden that limits the usefulness of DFT in many applications. For this reason fast Fourier transform systems including fast Fourier transforms (FFT's) and inverse fast Fourier transforms (IFFT's) were developed using mathematical shortcuts to reduce the number of calculations required for DFT's. FFT processing is most often performed in a digital signal processor (DSP) with sixteen bit words because it requires less power and fewer mega-instructions per second (MIPS). But accuracy suffers. For example, a sixteen bit (fixed point) 512 sample or point FFT that uses the unconditional shift by one approach has but an eight bit accuracy or approximately a 48 dB SNR. While a thirty-two bit FFT (double precision) has better accuracy, typically more then sixteen bit but requires four to six times the power and operations per multiplication. The rounding off costs about one bit of accuracy per stage of the FFT. The more stages the greater the loss of accuracy. FFTs are typically constructed of butterflies where the number of butterflies in a radix 2 FFT is equal to $n/2\log_2 n$ where n is the number of samples or points, and the number of stages is $\log_2 n$. The pair of equations that make up the two point DFT is called a radix-2 "butterfly". The butterfly is the core calculation of the FFT. The entire FFT is performed by combining butterflies in patterns determined by the FFT algorithm. So while sixteen bit FFT's are preferred for power and speed they are not satisfactory where accuracy is an important consideration. Another shortcoming of FFT's is that in order to accommodate for overflow conditions an unconditional shift right by one (divide by 2) technique is used. That is, given extreme conditions where both inputs to the butterflies are maximum at 1 the output could be 2, i.e. a 1 with a 1 carry. Since this is intolerable as the outputs must be between 0 and 1, the unconditional shift guarantees that the output doesn't exceed one. However, it pays the price of throwing away another bit in further rounding off. And even further it can be shown that under boundary conditions the maximum output could be $1 + \sqrt{2}$ or 2.414 a full 0.414 greater than 2 so that even the unconditional shift with its inherent error does not compensate for the possible overflow error in all conditions. Overall the signal to noise ration SNR is not as high as would be desirable.

BRIEF SUMMARY OF THE INVENTION

It is therefore an object of this invention to provide an improved method and system for fast Fourier transform (FFT/IFFT).

It is a further object of this invention to provide such an improved method and system for fixed point fast Fourier transform (FFT/IFFT).

It is a further object of this invention to provide such an improved method and system for fast Fourier transform (FFT/IFFT) with higher SNR.

It is a further object of this invention to provide such an improved method and system for fast Fourier transform (FFT/IFFT) which in a single precision sixteen bit array is at least four times faster and uses four to six times less power than a double precision thirty-two bit array.

It is a further object of this invention to provide such an improved method and system for fast Fourier transform (FFT/IFFT) which has improved accuracy with regard to round-off errors and overflow errors.

It is a further object of this invention to provide such an improved method and system for fast Fourier transform (FFT/IFFT) which gain ½ to 1 bit (3 dB–6 dB) of accuracy in each butterfly stage for improving the FFT SNR (For example in a 512 point FFT the SNR can be improved from 48 dB to 72 dB). The invention results from the realization that a more accurate faster and simpler fixed point fast Fourier transfer (FFT/IFFT) with higher SNR can be effected by determining from each stage of butterflies its minimum normalizing exponent and combining this with a stage guard scale value to predict a normalization scale factor to be used by the next stage to obtain the maximum butterfly output without overflow from that next stage.

This invention features a fixed point fast Fourier transform (FFT/IFFT) system with improved signal to noise ration (SNR) including a compute unit responsive to sample inputs and a twiddle factor for generating butterfly outputs for each stage and a scale unit responsive to a predicted normalization scale factor to scale the butterfly outputs of this stage to obtain the maximum butterfly output without overflow from this stage. There is a comparator unit responsive to the butterfly outputs of this stage to determine the minimum normalizing exponent of the butterfly outputs of this stage and an arithmetic logic unit responsive to the minimum normalizing exponent of this stage and a stage guard scale value to predict a normalization scale factor for the next stage to obtain the maximum butterfly output without overflow from that next stage.

In a preferred embodiment the scale unit may include a shift circuit. The compute unit, scale unit, comparator unit, and arithmetic logic unit may be implemented in a digital signal processor (DSP). There may be an input register circuit for providing the sample inputs, twiddle factor, and predicted normalization scale factor. There may be an output register circuit for storing the butterfly outputs and the input and output registers may be implemented in a DSP. Each stage may provide the predicted normalization scale factor to the next stage and receive a predicted normalization scale factor from the previous stage except for the first stage which has no previous stage and is provided with an initial normalization scale factor of zero and the last stage which provides no predictive normalization scale for there is no next stage. The system may be a radix-2 system. The stage guard value may be −1 for the first and second stages and −2 for subsequent stages. The minimum normalizing exponent may be set to the maximum fixed point length for each stage. The minimum normalizing exponent may range from 0–3. The normalization scale factor may be from −2 to +2.

The invention also features a method of improving signal to noise ratio in a fixed point fast Fourier transform (FFT/IFFT) by generating from sample inputs and a twiddle factor, butterfly outputs for each stage and scaling the butterfly outputs of this stage from a predicted normalization scale factor to obtain the maximum butterfly output without overflow from the stage. From the butterfly outputs of this stage there is determined the minimum normalizing exponent for the butterfly outputs of this stage and a normalization scale factor is predicted for the next stage from the minimum normalizing exponent of this stage and a stage guard scale value to obtain the maximum butterfly output without overflow from that next stage.

In a preferred embodiment, each stage may provide the predicted normalization scale factor to the next stage and receive a predicted normalization scale factor from the previous except for the first stage which has no previous stage and is provided with an initial normalization scale factor of 0 and the last stage which provides predicted normalization scale for there is no next stage. The system may be a radix-2 system. The stage guard value may be −1 for the first and second stages and −2 for subsequent stages. The minimum normalizing exponent may be set to maximum fixed point length for each stage. The minimum normalizing exponent may be from 0−(−1). The normalization scale factor may be from −1 to +0.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
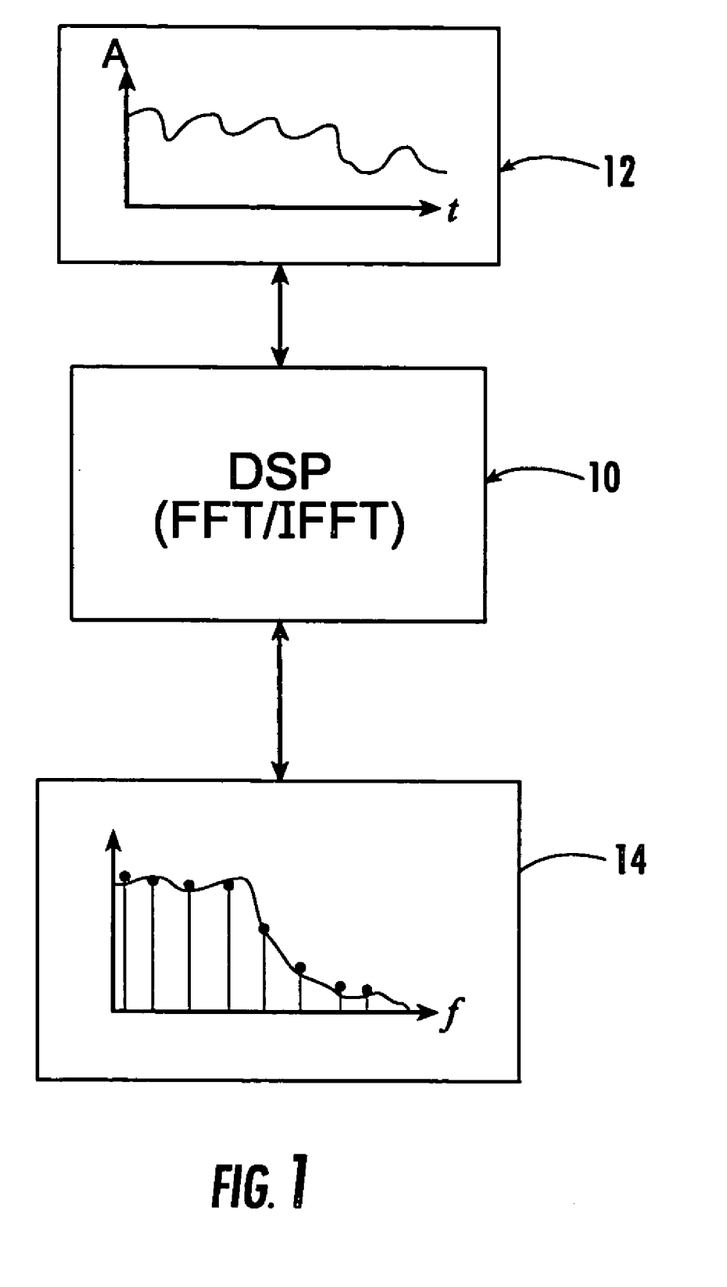
FIG. 1 is a simplified schematic block diagram of an FFT/IFFT implemented in a DSP with time domain and frequency domain inputs and outputs.
Figure 2:
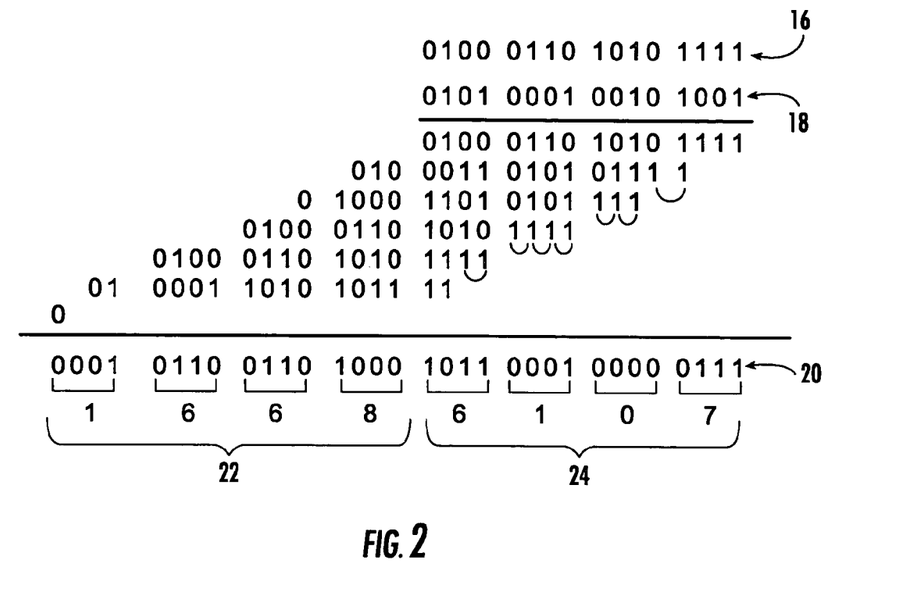
FIG. 2 is a graphic depiction of the multiplication of one sixteen bit number by another showing a thirty-two bit product.

There is shown in FIG. 1 a simplified schematic block diagram of a fast Fourier transform (FFT/IFFT) implemented in a digital signal processor DSP 10 which can operate either as an FFT in the forward direction converting a time domain signal 12 to a frequency domain signal 14 or in the inverse by converting a frequency domain signal 14 into a time domain signal 12. One of the problems with typical sixteen bit digital signal processors performing fast Fourier transforms (FFT/IFFT) is that, in each of the many multiplications required for the transform, the sixteen bit number 16, FIG. 2, multiplied by another sixteen bit number 18 produces a thirty-two bit product 20. In a sixteen bit processor this means that only the first most significant (MSW) sixteen bits 22 are referenced. The other sixteen bits 24 of the thirty-two bits are lost due to rounding off because they exceed the capacity of the sixteen bit processor. This of course has a serious detrimental effect on the accuracy. In fact in a sixteen bit processor a five hundred and twelve sample input using the unconditional shift by one method will have only about an eight bit accuracy or a forty-eight dB signal to noise ratio (SNR).

Figure 3:
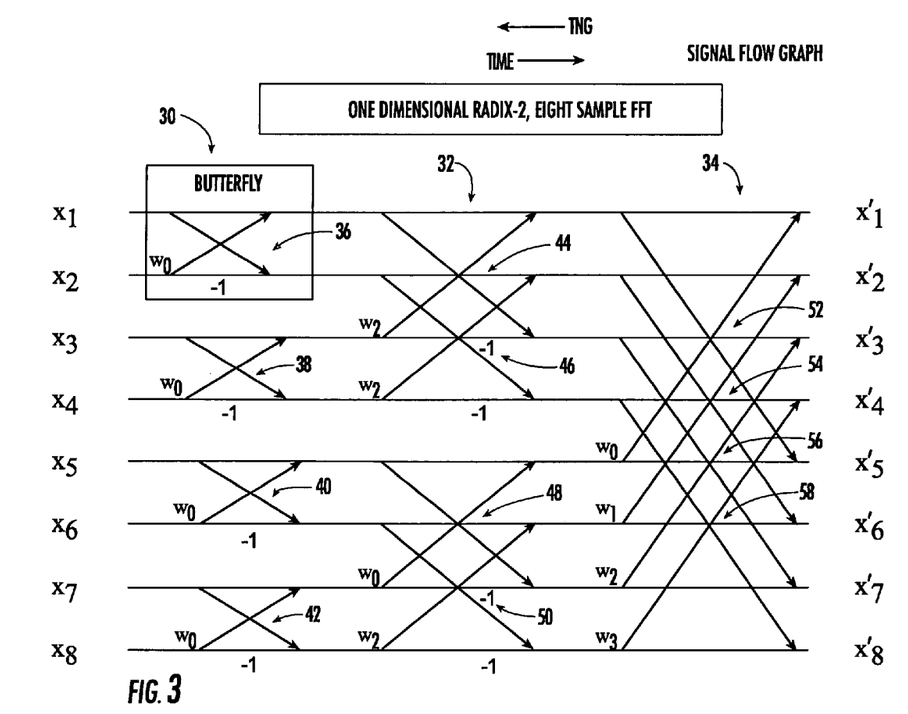
FIG. 3 is a signal flow graph of the butterfly array of a one dimensional eight sample or point radix-2 FFT.

A typical implementation of a fast Fourier transform (FFT/IFFT) is done using butterflies as shown by the signal flow graph of a one-dimensional, radix-2, eight sample FFT, FIG. 3, which receives eight sample inputs $x_1$–$x_8$ and provides eight outputs $x'_1$–$x'_8$ using three stages 30, 32, and 34 each containing four butterflies 36-42, 44-50, and 52-58 respectively. The butterfly array to implement a particular transform depends upon the number of samples or points or inputs. For example:

$$\# \text{ Butterflies} = \frac{n}{2}\log_2 n \qquad (1)$$

$$\# \text{ Butterflies} = \frac{8}{2}\log_2 8 \qquad (2)$$

$$\#\text{Butterflies} = 4 \times 3 = 12 \qquad (3)$$

so that the number of butterflies is twelve, the:

$$\#\text{Stages} = \log_2 n \qquad (4)$$

$$\#\text{Stages} = \log_2 n \qquad (5)$$

$$\#\text{Stages} = 3 \qquad (6)$$

and the:

$$\# \text{ Butterflies/Stage} = \frac{n}{2} \qquad (7)$$

$$\text{\# Butterflies/Stage} = \frac{8}{2} \qquad (8)$$

$$\text{\#Butterflies/Stage}=4 \qquad (9).$$

In stage 30, each butterfly 36-42 accepts a pair of adjacent inputs $x_1, x_2; x_3, x_4; x_5, x_6;$ and $x_7, x_8$. In stage 32, butterflies 44-50 receive their inputs from every second butterfly output of the first stage, and in stage 34 each of the butterflies 52-58 take their inputs from every fourth input from the butterflies of the previous stage. Each of the butterflies also receives what is known as a "twiddle" factor which may vary from stage to stage, butterfly to butterfly, and is indicated as $w_0$–$w_3$ for example.

Each butterfly employs a sequence of operations that uses both addition or summation and multiplication. As shown by butterfly 36, shown in greater detail in FIG. 4, input $x_1$ is fed directly to adder or summer 60 while input $x_2$ is delivered to multiplier 62 where it is multiplied by the assigned twiddle factor $w_0$ to obtain $x_2w_0$. This value $x_2w_0$ is fed to summer 60 and summer 64 where on adder 60 it is combined with the input $x_1$ to provide the output $x_1+x_2w_0$ which equals the output $x'_1$. And on summer 64 it is subtracted form input $x_1$ to provide the resultant $x_1-x_2w_0$ which is the output $x'_2$. Each butterfly functions in the same way.

Figures 4, 5:
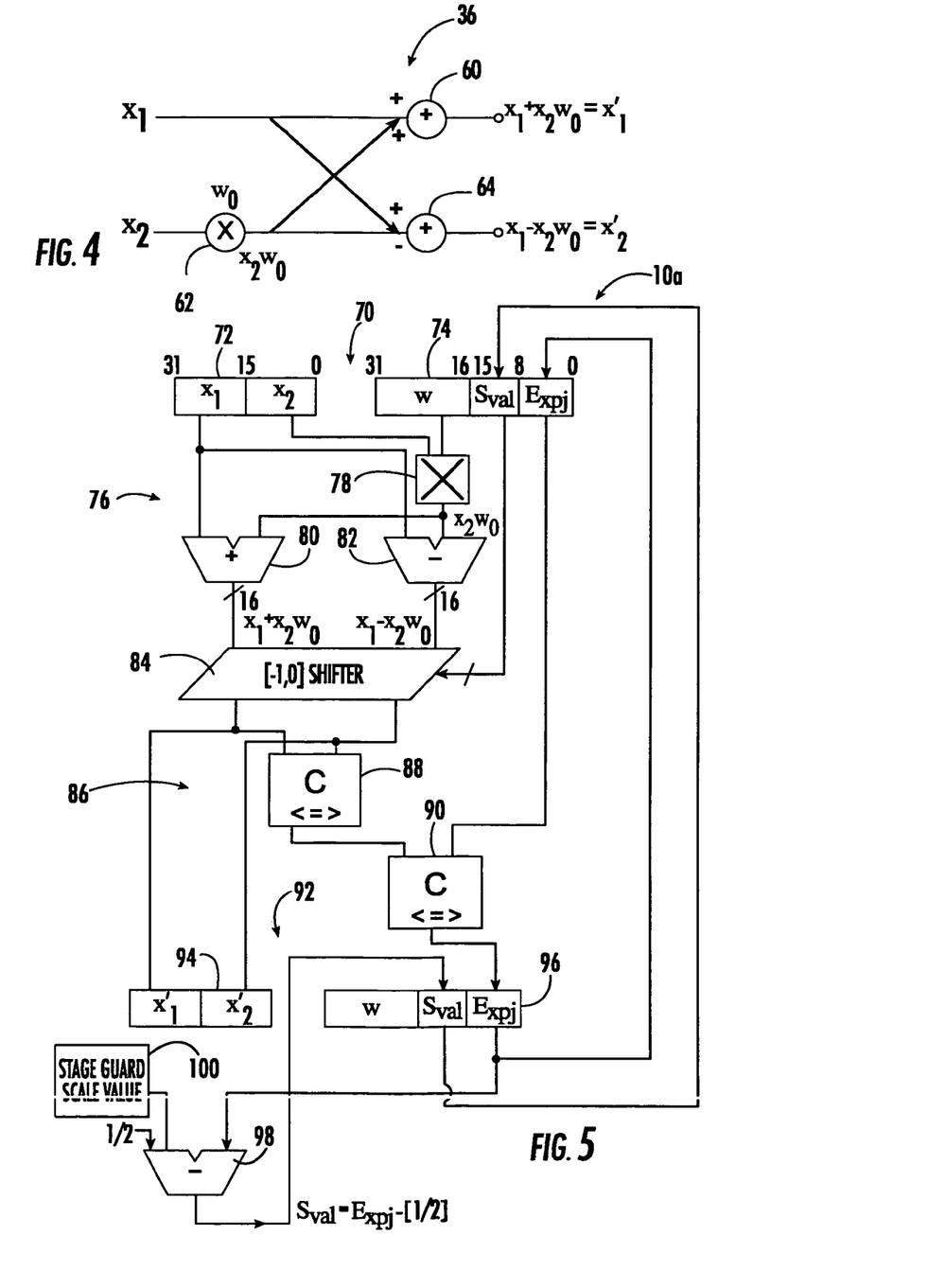
FIG. 4 is a more detailed view of a butterfly of FIG. 3 showing input, output and interim signals for real number implementation.
FIG. 5 is a schematic diagram of a real number fast Fourier transform (FFT/IFFT) system which predicts next stage normalization factors according to this invention.

In one implementation using a DSP according to this invention, the entire butterfly array can be implemented using an iterative loop, as shown in FIG. 5 where DSP 10a contributes input register circuit 70 including input register 72 and 74 and a compute unit 76 including multiplier 78, adders 80 and 82, and a scale unit 84 such as a shift register. Also included is a comparator unit 86 including for example, comparators 88 and 90 and an output register circuit 92 including output registers 94 and 96. Input register 72 contains two sample points $x_1$ and $x_2$ to be operated on in this butterfly. Register 74 may include twiddle factor w, the minimum normalizing exponent $E_{xpj}$, and the stage normalization scale factor $S_{val}$.

Hereinafter like parts have been given like numbers and similar parts like numbers accompanied by a lower case letter.

Figure 11:
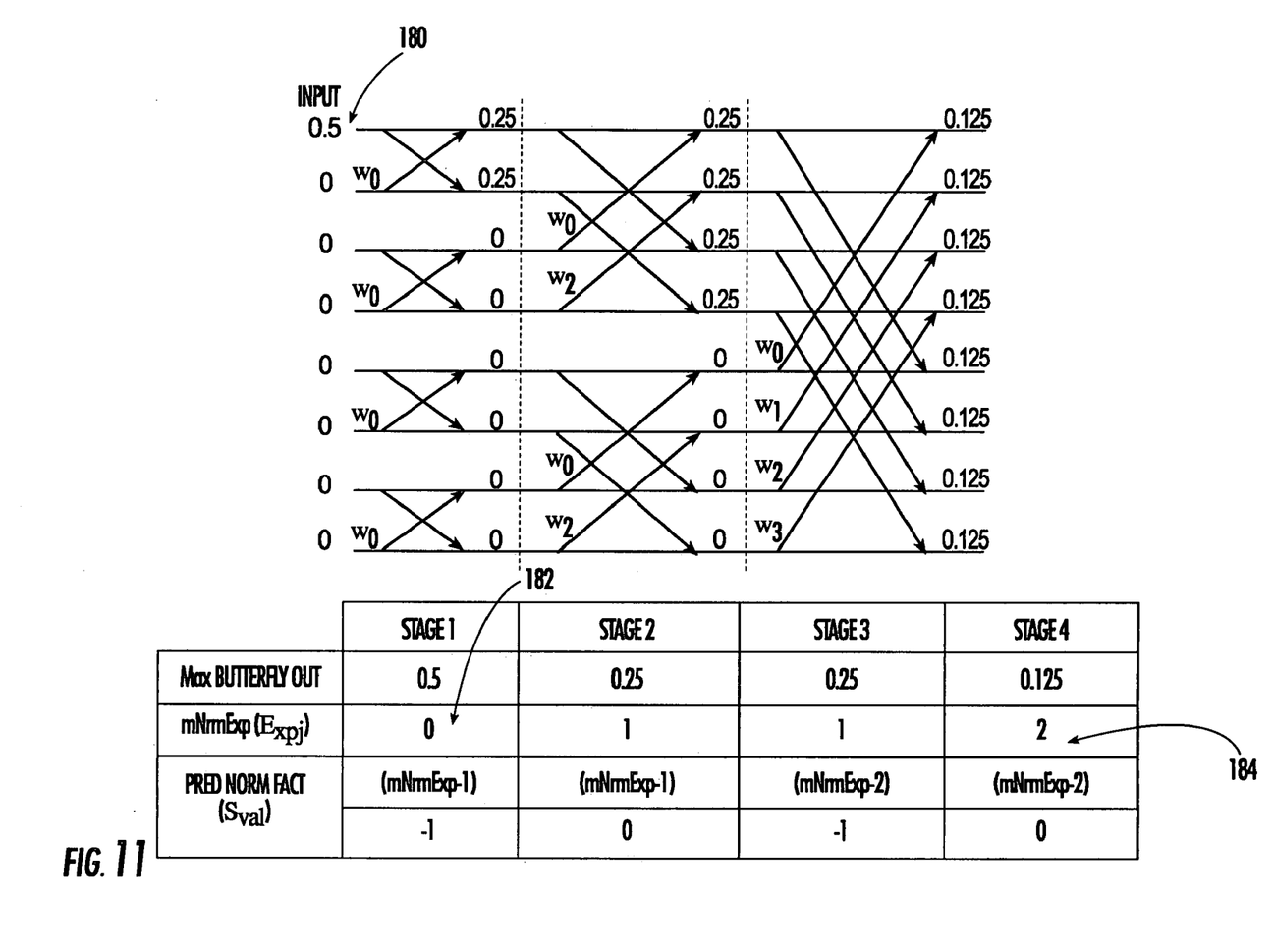
FIG. 11 is an example that shows the upper and lower boundary of a stage minimum normalizing exponent ($E_{xpj}$).

In operation, the multiplications as explained with respect to FIG. 4 are carried out in multiplier 78 and adders 80 and 82, FIG. 5, to obtain the resultant values $x_1+x_2w_0$ and and $x_1-x_2w_0$ which are provided to shifter 84. These outputs are then shifted by an amount determined by the stage normalization scale factor $S_{val}$ so that the overflow and roundoff errors are minimized according to this invention. If this is the first stage, the $S_{val}$ is set at zero. If it is a subsequent stage, $S_{val}$ will be the stage normalization scale factor predicted from the previous stage as will be explained hereinafter. The butterfly outputs output by shifter 84 are delivered to the output register 94 as $x'_1$, and $x'_2$. Those same outputs are also submitted to comparators 88 and 90 in order to determine the minimum normalizing exponent between the iterated $E_{xpj}$ and the normalizing exponent for the current butterfly output. If this is the first butterfly, the $E_{xpj}$ in register 74 is loaded as the highest number of the bit capacity of the system. For example, in a sixteen bit system, the number loaded would be fifteen. The minimum number thus calculated is loaded into register 96 and is delivered back to register 74 for the next butterfly operation. When the operation of the last butterfly in a stage has been completed, the final $E_{xpj}$ or the minimum normalizing exponent for all of the butterflies in that stage is submitted to summing circuit 98 with a value from stage guard scale value circuit 100. The output of summer 98 is then delivered to the $S_{val}$ position in register 96, which becomes the new $S_{val}$ in the input register 74 the predicted normalization scale factor for the next stage to obtain the maximum butterfly output without overflow from that next stage. The stage guard value is set to -1 for the first and second stages and -2 for the rest. According to stage guard scale value it can be seen that $E_{xpj}$ can range from 0 to 2, knowing this fact a very low cost shifter that only supports -1 to +0 shift modes can be used to implement shifter circuit 84. The two extreme values of $E_{xpj}$ can be explained by following the example given in FIG. 11 where the input 180 is 0.5 for $x_1$ and 0 for the rest. As can be seen the minimum normalization exponent $E_{xpj}$ without an overflow gets it's minimum value of 0, 182, at the output of stage 1 and gets it's maximum value of 2, 184, at the output of stage 4.

Figure 6:
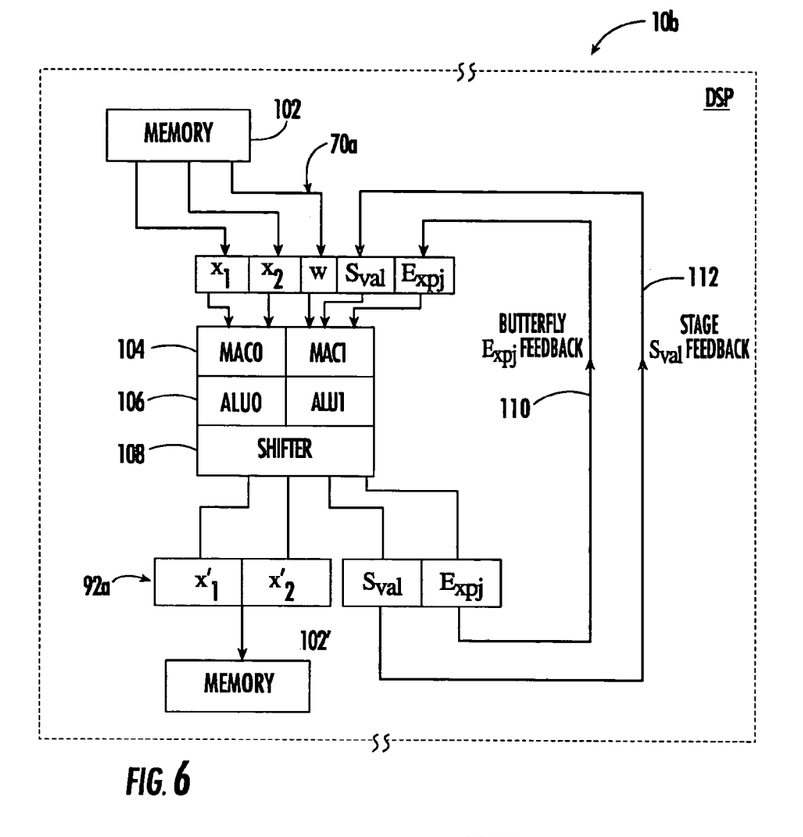
FIG. 6 is a block diagram of an FFT/IFFT implemented in a DSP illustrating the iterative operation from butterfly to butterfly and stage to stage.

The iterative operation which executes the butterfly operation can be better understood where DSP 10b, FIG. 6, is shown as including memory 102, 102' for providing pairs of inputs $x_1$–$x_8$ and the twiddle factor w to register circuit 70a and for receiving pairs of outputs $x'_1$–$x'_8$. The DSP also includes a number of multiply-accumulate circuits 104, arithmetic logic units 106, and shifters 108 which implement the compute unit 76, scale unit 84, comparator unit 86, and summer 98 of FIG. 5.

Figure 7:
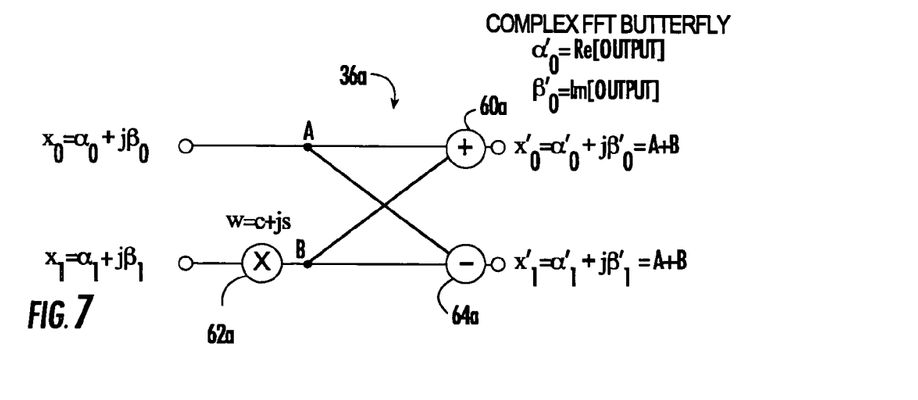
FIG. 7 is a more detailed view of a butterfly of FIG. 3 showing input, output and interim signals for real and imaginary number implementation.

In operation, each butterfly generates its scaled outputs $x'_1$–$x'_8$ using the predicted stage normalization scale factor ($S_{val}$) and a minimum normalizing exponent between the incoming $E_{xpj}$ and the normalizing exponent for the current butterfly output. The updated $E_{xpj}$ value is recycled on line 110 from register circuit 92a back to the corresponding position in register circuit 70a. After the last butterfly operation in a stage, the final $E_{xpj}$ representing the minimum normalizing exponent for all of the butterflies in that stage is combined with the stage guard scale value in summer 98b to produce the predicted normalization scale factor $S_{val}$ which is delivered on feedback line 112 to the corresponding position in register 70a to become the normalization scale factor for the next stage to obtain the maximum butterfly output without overflow from that next stage. While FIG. 5 illustrates an implementation working with real numbers, the system functions as well with combined real and imaginary numbers as shown in FIG. 7 where the inputs, $x_0$ and $x_1$, to butterfly 36a, are now complex numbers. For example: input sample $x_0=\alpha_0+j\beta_0$, and input sample $x_1=\alpha_1+j\beta_1$. The twiddle factor w is also a complex number equal to c+js. The output, $x'_0=\alpha'_0+j\beta'_0$ is equal to the summation of the values at points A and B. And output $x'_1=\alpha'_1+j\beta'_1$ equals A-B, the difference in the values of points A and B. By expanding and simplifying through expressions 10–14, it can be seen that the final outputs are as shown in expressions 12 and 14:

$$B=(\alpha_1+j\beta_1)(c+js)=(\alpha_1c-\beta_1s)+j(\beta_1c+\alpha_1s) \qquad (10)$$

$$A+B = \alpha_0 + j\beta_0 + (\alpha_1c - \beta_1s) + j(\beta_1c + \alpha_1s) \qquad (11)$$

$$= \underbrace{(\alpha_0 + \alpha_1c - \beta_1s)}_{\text{Real}} + \underbrace{j(\beta_0 + \beta_1c + \alpha_1s)}_{\text{Imaginary}} \qquad (12)$$

$$A-B = \alpha_0 + j\beta_0 - [(\alpha_1c - \beta_1s) + j(\beta_1c + \alpha_1s)] \qquad (13)$$

$$= \underbrace{(\alpha_0 - \alpha_1c + \beta_1s)}_{\text{Real}} + \underbrace{j(\beta_0 - \beta_1c - \alpha_1s)}_{\text{Imaginary}} \qquad (14)$$

Figure 8:
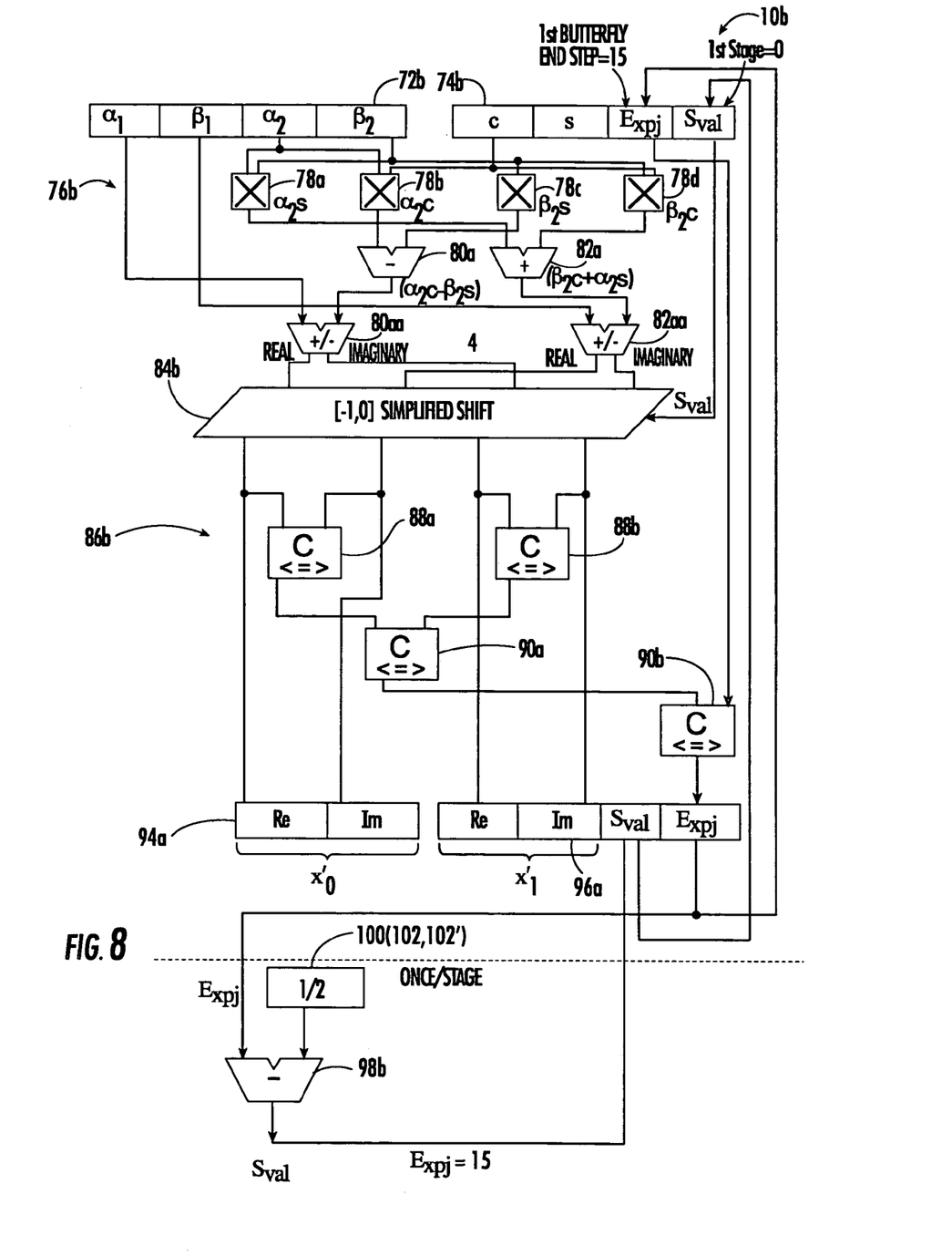
FIG. 8 is a schematic diagram of a real and imaginary number fast Fourier transform (FFT/IFFT) system which predicts next stage normalization factors according to this invention.

It can be further seen that real part of expression (12), $\alpha_0+\alpha_1c-\beta_1s$ is exactly the same as the real part in expression (14) except that the signs are changed. That is, the real part of expression (14) is $\alpha_0-\alpha_1c+\beta_1s$. The same comparison can be seen for the imaginary parts in expressions (12) and (14). Thus the same arithmetic manipulations are made in both cases, only the signs change. This makes for a straightforward implementation as shown in FIG. 8 where it can be seen that register 72b has been expanded to take both the real and imaginary components. Compute unit 76b includes four multipliers 78a–d and four adder/subtractors 80a, 82a, 80aa, and 82aa which produce the real and imaginary outputs as set forth in expressions (12) and (14) to shifter 84b. Comparator unit 86b includes four comparators, 88a, 88b, 90a, and 90b and the stage guard scale values can be provided to summer or adder 98b either from a stage guard scale value circuit 100 or from memory 102, 102'.

The approach of this invention also corrects for errors due to the fact that the real and imaginary parts of the butterfly output can be greater than 2.0 actually up to 2.414 shown by the following exposition of the real and imaginary parts boundary. Given:

$$x'_0 = \alpha_0 + \alpha_1 c - \beta_1 s + j(\beta_0 + \alpha_1 s + \beta_1 c) \quad (15)$$

$$x'_1 = \alpha_0 - \alpha_1 c + \beta_1 s + j(\beta_0 - \alpha_1 s - \beta_1 c) \quad (16).$$

To calculate a bound for $x'_1$ and at the butterfly output when it is known that:

$$0.5 \leq |\alpha_0|, |\alpha_1|, |\beta_0|, |\beta_1| < 1. \quad (17)$$

without losing generality:

$$|\alpha_0 + \alpha_1 c + \beta_1 s| \leq |\alpha_0| + |\alpha_1||c| + |\beta_1||s| \leq M + M|c| + M|s| \leq M(1 + |s| + |c|) \quad (18)$$

where $$0.5 \leq M < 1 \quad (19)$$

again without losing generality it can be assumed that for $$c + js = e^{jw}, 0 \leq \omega < \frac{\pi}{2}$$

such that:

$$|c| + |s| = c + s = \cos(\omega) + \sin(\omega) = \frac{2}{\sqrt{2}}\sin\left(\omega + \frac{\pi}{4}\right) \quad (20)$$

so it is obvious that, $$\max_{0 \leq \omega < \pi/2}(\cos(\omega) + \sin(\omega)) = \sqrt{2} \text{ hence}$$

$\{\cos(\omega)+\sin(\omega)\}=\sqrt{2}$ hence $$|\alpha_0 + \alpha_1 c + \beta_1 s| \leq |\alpha_1| + |\alpha_0||c| + |\beta_1||s| \leq M + M|c| + M|s| = M(1 + |s| + |s| + |c|) = M(1+\sqrt{2}) \quad (21)$$

for $0.5 \leq M < 1$, it can be concluded that $$|\alpha_0 + \alpha_1 c + \beta_1 s| \leq 1(1+\sqrt{2}) \quad (22)$$

Figure 9:
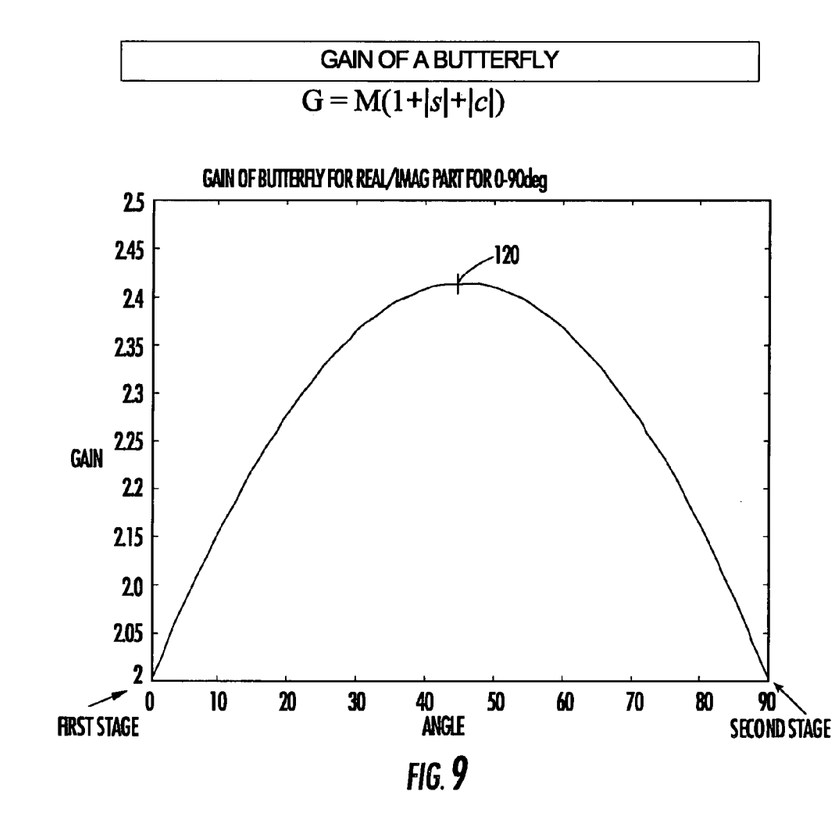
FIG. 9 is a graph of the gain of a butterfly for the real and imaginary points from 0–90 degrees illustrating the error of up to 2.414.

Therefore it can be seen that the maximum value of the real and imaginary parts at the butterfly output is 2.414 not merely 2.0. This can be seen in the graphical illustration of FIG. 9 where the ordinate is the gain and the abscissa is the angle from the first stage to the second. There it is apparent that at 45 degrees, 120, it can be seen that the gain is 2.414 not just 2.0.

Figure 10:
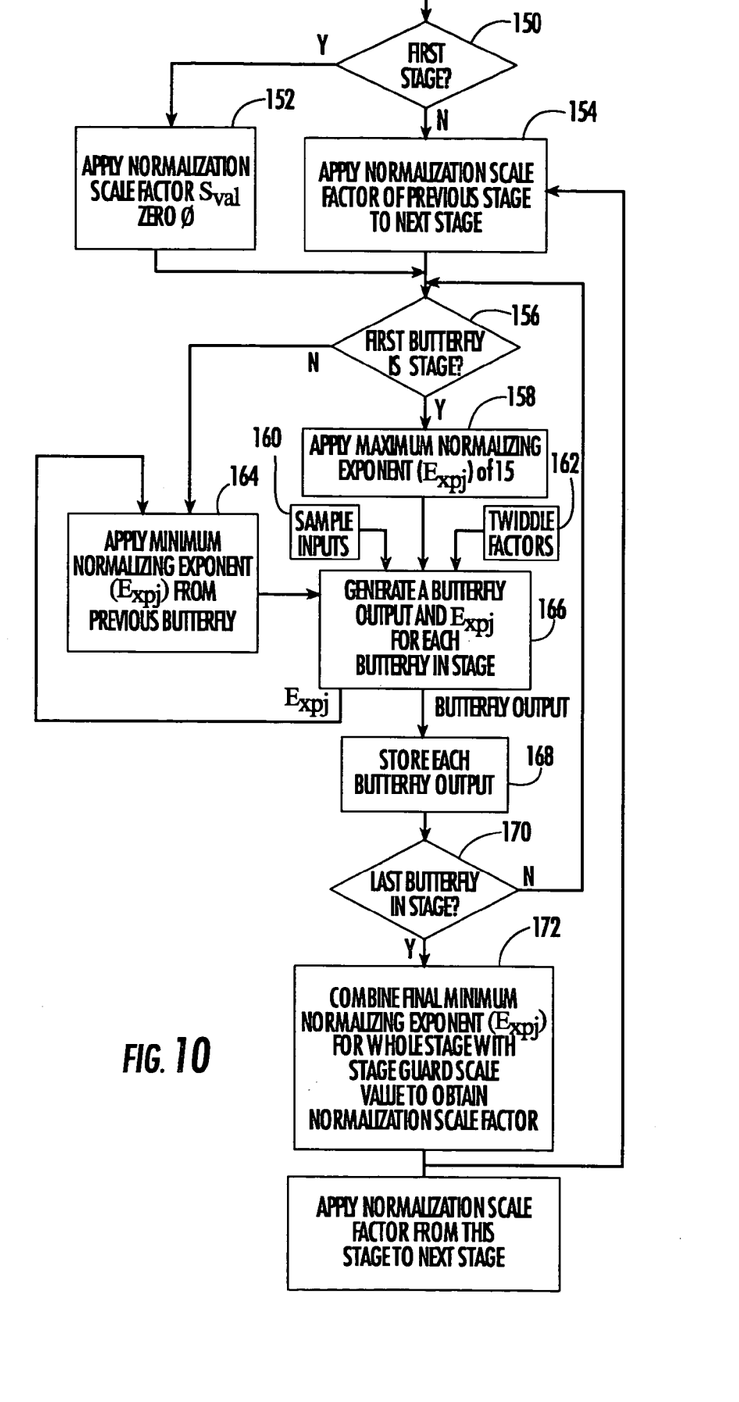
FIG. 10 is a flow chart showing one embodiment of the method of this invention.

The method of this invention can be accomplished as shown in FIG. 10 by ascertaining first whether the stage with the butterfly array being worked on is the first stage or not in step 150. If it is the first stage the stage normalization scale value $S_{val}$ of zero is applied. If it is not the first stage, step 152, then the normalization scale factor that was calculated in the previous stage is applied to the current stage 154. The global stage minimum $E_{xpj}$ is recursively evaluated at the output of each of the stage butterflies by comparing and selecting the minimum between recycled $E_{xpj}$ and the current butterfly normalizing exponent output using the following three steps: (a) inquiry is made as to whether this is the first butterfly in a stage 156. If it is (b) the minimum normalizing exponent ($E_{xpj}$) of 15 is applied in step 158. If it is not the first butterfly in a stage but is a subsequent butterfly in a stage, (c) the minimum normalizing exponent ($E_{xpj}$) from the previous butterfly is applied in step 164 to find the local minimum between the two. In either case, the next step 166 is to generate a butterfly output and $E_{xpj}$ for each butterfly in the stage using the sample inputs 160 and twiddle factors 162 and the stage normalization scale value $S_{val}$. Each butterfly output is then stored 168. If it is not the last butterfly in a stage 170, the system returns to step 156. If it is the last butterfly in a stage then the final minimum normalizing exponent ($E_{xpj}$) which in fact is the minimum normalizing exponent for all of the butterflies in that stage is combined with the stage guard scale value 172 to obtain the predicted normalization scale factor of the next stage, which is presented in step 154.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A fixed point fast Fourier transform (FFT/IFFT) system with improved SNR comprising:
   a compute unit responsive to sample inputs and a twiddle factor for generating butterfly outputs for each stage;
   a scale unit responsive to a predicted normalization scale factor to scale the butterfly outputs of this stage to obtain the maximum butterfly output without overflow from this stage;
   a comparator unit responsive to the butterfly outputs of this stage to determine the minimum normalizing exponent for the butterfly outputs of this stage; and
   an arithmetic logic unit responsive to said minimum normalizing exponent of this stage and a stage guard scale value to predict a normalization scale factor for the next stage to obtain the maximum butterfly output without overflow from that next stage.

2. The fast Fourier transform (FFT/IFFT) system of claim 1 in which said scale unit includes a shift circuit.

3. The fast Fourier transform (FFT/IFFT) system of claim 1 in which said compute circuit, scale unit, comparator unit, and arithmetic logic unit are implemented in a digital signal processor (DSP).

4. The fast Fourier transform (FFT/IFFT) system of claim 1 further including an input register circuit for providing said sample inputs, twiddle factor, and predicted normalization scale factor.

5. The fast Fourier transform (FFT/IFFT) system of claim 1 further including an output register circuit for storing the butterfly outputs, and minimum normalization exponent.

6. The fast Fourier transform (FFT/IFFT) system of claim 1 further including an input register circuit for providing said sample inputs, twiddle factor, and predicted normalization scale factor and an output register circuit for storing the butterfly outputs, and minimum normalization exponent in which said input and output register circuits are implemented in a DSP.

7. The fast Fourier transform (FFT/IFFT) system of claim 1 in which each stage provides the predicted normalization scale factor to the next stage and receives a predicted normalization scale factor from the previous stage except for the first stage which has no previous stage and is provided with an initial normalization scale factor of zero and the last stage which provides no predictive normalization scale.

8. The fast Fourier transform (FFT/IFFT) system of claim 1 in which said system is radix-2.

9. The fast Fourier transform (FFT/IFFT) system of claim 8 in which said stage guard value is −1 for the first and second stages and −2 for subsequent stages.

10. The fast Fourier transform (FFT/IFFT) system of claim 9 in which said minimum normalizing exponent is from 0 to 2.

11. The fast Fourier transform (FFT/IFFT) system of claim 1 in which said minimum normalizing exponent is set to maximum fixed point length for each stage.

12. The fast Fourier transform (FFT/IFFT) system of claim 11 in which said normalization scale factor is from −1 to 0.

13. A method of improving signal to noise ratio (SNR) in a fixed point fast Fourier transform (FFT/IFFT) for conducting a frequency analysis of a signal, the method comprising:
generating from sample inputs and a twiddle factor butterfly outputs for each stage;
scaling the butterfly outputs of this stage from a predicted normalization scale factor to obtain the maximum butterfly output without overflow from this stage;
determining from the butterfly outputs of this stage the minimum normalizing exponent for the butterfly outputs of this stage; and
predicting a normalization scale factor of the next stage from said minimum normalizing exponent of this stage and a stage guard scale value to obtain the maximum butterfly output without overflow from that next stage.

14. The method of claim 13 in which each stage provides the predicted normalization scale factor to the next stage and receives a predicted normalization scale factor from the previous stage except for the first stage which has no previous stage and is provided with an initial normalization scale factor of zero and the last stage which provides no predictive normalization scale.

15. The method of claim 13 in which said system is radix-2.

16. The method of claim 15 in which said stage guard value is −1 for the first and second stages and −2 for subsequent stages.

17. The method of claim 16 in which said minimum normalizing exponent is from 0 to 2.

18. The method of claim 13 in which said minimum normalizing exponent is set to maximum fixed point length for each stage.

19. The method of claim 18 in which said normalization scale factor is from −1 to 0.

* * * * *